US011908291B2

(12) United States Patent
Fanshier et al.

(10) Patent No.: US 11,908,291 B2
(45) Date of Patent: Feb. 20, 2024

(54) RECONFIGURABLE POWER MODES

(71) Applicant: Freeus, LLC, Ogden, UT (US)

(72) Inventors: Rand Adam Fanshier, Pleasant View, UT (US); Craig Roger Pyle, Draper, UT (US); Derek Mark Lomax, Layton, UT (US); Brock McKay Winzeler, Harrisville, UT (US); Joshua Garner, Salt Lake City, UT (US)

(73) Assignee: Freeus, LLC, Ogden, UT (US)

( * ) Notice: Subject to any disclaimer, the term of this patent is extended or adjusted under 35 U.S.C. 154(b) by 0 days.

(21) Appl. No.: 16/935,176

(22) Filed: Jul. 21, 2020

(65) Prior Publication Data

US 2022/0139177 A1 May 5, 2022

(51) Int. Cl.
*G08B 1/08* (2006.01)
*G08B 25/01* (2006.01)

(52) U.S. Cl.
CPC ............. *G08B 1/08* (2013.01); *G08B 25/016* (2013.01)

(58) Field of Classification Search
CPC ......... G08B 1/08; G08B 25/12; G08B 25/016
See application file for complete search history.

(56) References Cited

U.S. PATENT DOCUMENTS 7,472,300 B1 * 12/2008 Haustein ............... G06F 3/0625 713/323
8,390,670 B1 * 3/2013 Gottlieb ................... H04N 7/15 348/14.08
9,648,564 B1 * 5/2017 Cui ................... H04W 52/0222
10,080,193 B1 * 9/2018 Bleu-Laine ....... H04W 52/0212
2003/0210240 A1 * 11/2003 Lacayo ................... G06F 3/147 345/212
2005/0075116 A1 * 4/2005 Laird .................... A61B 5/1117 455/414.1

(Continued)

FOREIGN PATENT DOCUMENTS

WO WO-2019066582 A1 * 4/2019 ............ H04W 4/021

OTHER PUBLICATIONS

Ricoh Company LTD, Ricoh launches a reset timer IC with shipping mode . . . , Jan. 2019, (Year: 2019).*

*Primary Examiner* — Joseph H Feild
*Assistant Examiner* — Rufus C Point
(74) *Attorney, Agent, or Firm* — MASCHOFF BRENNAN; Paul G. Johnson

(57) ABSTRACT

An example method to reconfigure power modes of a communication device includes operating the communication device in a first power mode. The method includes receiving a power mode reconfiguration command from a server that instructs the communication device to operate in a second power mode that is different than the first power mode. The method includes, in response to receiving the power mode reconfiguration command, terminating operation of the communication device in the first power mode and operating the communication device in the second power mode. A communication device with reconfigurable power modes may include an MCU, a processor (e.g., CPU) communicatively coupled to the MCU, and a non-transitory computer-readable medium communicatively coupled to the processor. The non-transitory computer-readable medium has instructions stored thereon that are executable by the processor to perform or control performance of the foregoing method.

18 Claims, 3 Drawing Sheets

(56) References Cited

U.S. PATENT DOCUMENTS

| | | | | |
|---|---|---|---|---|
| 2005/0097380 | A1* | 5/2005 | Kim | H04M 1/72424 713/323 |
| 2007/0118186 | A1* | 5/2007 | Knauper | G16Z 99/00 607/59 |
| 2007/0152837 | A1* | 7/2007 | Bischoff | G08B 25/005 340/521 |
| 2008/0143604 | A1* | 6/2008 | Mock | G08B 13/2462 342/450 |
| 2008/0144086 | A1* | 6/2008 | Shibao | H04N 1/00344 358/1.15 |
| 2009/0061954 | A1* | 3/2009 | Syed | H04W 52/0225 455/574 |
| 2010/0046736 | A1* | 2/2010 | Ashimi | H04L 65/1053 713/323 |
| 2010/0203905 | A1* | 8/2010 | Chaubey | H04W 68/00 455/458 |
| 2011/0072103 | A1* | 3/2011 | Goto | G06F 1/3209 709/208 |
| 2011/0294442 | A1* | 12/2011 | Tsujimoto | H04L 69/22 455/73 |
| 2012/0064855 | A1* | 3/2012 | Mendelson | G01S 1/68 455/404.1 |
| 2012/0072751 | A1* | 3/2012 | Das | H04W 76/45 709/224 |
| 2013/0201891 | A1* | 8/2013 | Rodriguez | H04W 40/005 370/311 |
| 2013/0286920 | A1* | 10/2013 | Shinoki | H04W 52/0248 370/311 |
| 2014/0278084 | A1* | 9/2014 | Lau | G06F 1/3212 701/526 |
| 2014/0334370 | A1* | 11/2014 | Tan | H04L 12/5692 370/311 |
| 2015/0028995 | A1* | 1/2015 | Gautama | G06F 1/3215 340/5.72 |
| 2016/0041596 | A1* | 2/2016 | Alcantara | G06F 1/3268 713/320 |
| 2016/0315998 | A1* | 10/2016 | Johnson | H04L 67/535 |
| 2016/0328952 | A1* | 11/2016 | Will | G08B 19/005 |
| 2016/0379479 | A1* | 12/2016 | Nepo | G08B 15/004 340/539.13 |
| 2017/0274790 | A1* | 9/2017 | Kim | B60L 1/00 |
| 2017/0318146 | A1* | 11/2017 | Peter | H04M 1/72436 |
| 2018/0267593 | A1* | 9/2018 | Ramasamy | G06F 1/329 |
| 2018/0332162 | A1* | 11/2018 | Schutter | H04W 12/61 |
| 2019/0104467 | A1* | 4/2019 | Rahkala | H04W 56/001 |
| 2019/0230593 | A1* | 7/2019 | Tseng | H04W 52/0229 |
| 2020/0322888 | A1* | 10/2020 | Dushane | H04W 52/0229 |

* cited by examiner

RECONFIGURABLE POWER MODES

FIELD

The embodiments discussed herein are related to reconfigurable power modes of communication devices.

BACKGROUND

Unless otherwise indicated herein, the materials described herein are not prior art to the claims in the present application and are not admitted to be prior art by inclusion in this section.

A medical alarm is an alarm system designed to signal the presence of a hazard requiring urgent attention and to summon emergency medical personnel. Communication devices deployed in such systems for users are commonly referred to as Personal Emergency Response System (PERS) devices or medical alert devices. Such medical alert devices may also be referred to as mobile PERS (MPERS) devices depending on the capabilities.

Typical PERS devices include a wireless pendant or transmitter with a button that can be activated by a user of the PERS device in an emergency. When the button is activated by the user, the signal is transmitted to an alarm monitoring company's central station, other emergency agency, or other programmed phone numbers. An operator or other individual at the central station, the emergency agency, or with the programmed phone number may assist the user remotely and/or may dispatch medical or other personnel to a location of the user to assist the user.

Elderly people and disabled people who live alone commonly use and/or require PERS devices.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to reconfigure power modes of a communication device includes operating the communication device in a first power mode. The method includes receiving a power mode reconfiguration command from a server that instructs the communication device to operate in a second power mode that is different than the first power mode. The method includes, in response to receiving the power mode reconfiguration command, terminating operation of the communication device in the first power mode and operating the communication device in the second power mode.

In another example embodiment, a communication device with reconfigurable power modes include an MCU, a processor (e.g., CPU) communicatively coupled to the MCU, and a non-transitory computer-readable medium communicatively coupled to the processor. The non-transitory computer-readable medium has instructions stored thereon that are executable by the processor to perform or control performance of operations. The operations include operating the communication device in a first power mode. The operations include receiving a power mode reconfiguration command from a server that instructs the communication device to operate in a second power mode that is different than the first power mode. The operation includes, in response to receiving the power mode reconfiguration command, terminating operation of the communication device in the first power mode and operating the communication device in the second power mode.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Figure 1:
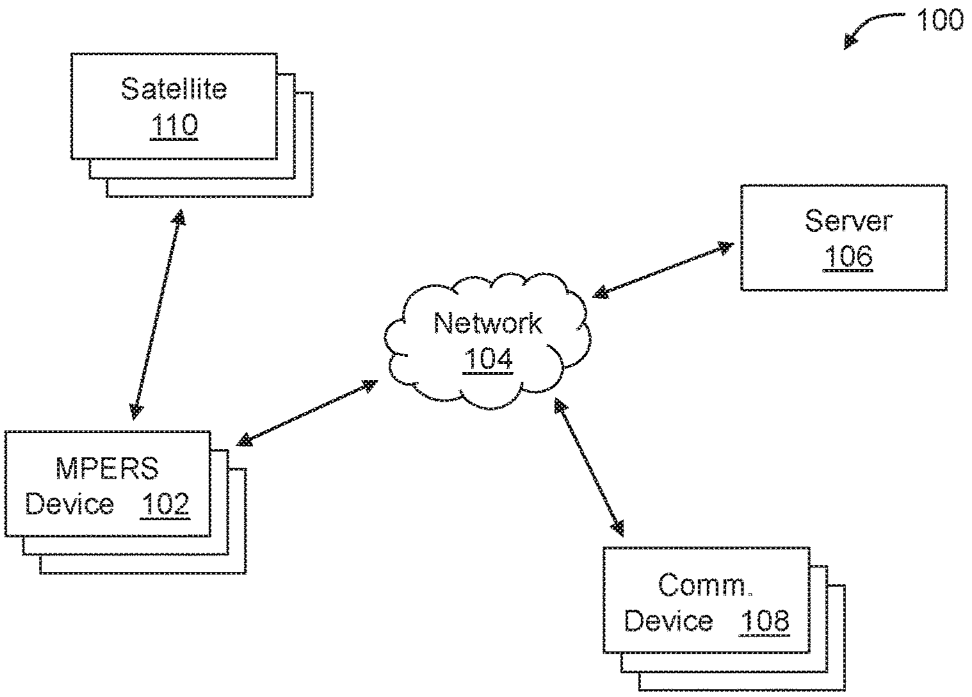
FIG. 1 depicts an example operating environment in which MPERS devices may be implemented.

MPERS devices typically have a fixed power mode. They can be built for maximum battery life (lowest power-consuming mode), maximum availability (highest power-consuming mode), or anything in between, but the power mode is always fixed and built into the hardware.

MPERs devices with the longest battery life turn on periodically (e.g., once every 24 hours) to report status to the server and to receive any updates or data from the server. They also turn on in response to initiation of a medical alert by the user, but there is some delay as the device powers on before the medical alert event is reported to the server. This delay can be avoided in MPERS devices in the always on mode at the expense of significantly shortened battery life.

Embodiments described herein include MPERS devices with reconfigurable (e.g., software reconfigurable) power modes. Such MPERS devices may have at least two different power modes: a first power mode that may be referred to as an always connected mode and a second power mode that may be referred to as an airplane mode or ready mode. In the first power mode, a central processing unit (CPU) or other main processor of the MPERS device and a communication interface (e.g., a modem) of the MPERS device may be continuously powered. In the second power mode, the CPU or other main processor may be continuously powered while the communication interface may be intermittently powered. In the second power mode, for example, the communication interface may be powered according to a predetermined schedule to report its status and receive any updates or data from the server; may be powered to report an emergency event in response to actuation of an emergency button of the MPERS device by a user of the MPERS device, and may be powered down at other times. Airplane mode is similar to airplane mode of a smartphone: the communication interface is shut down but at least some other components of the device (e.g., accelerometer, main processor, etc.) may remain on when in airplane mode.

In a typical implementation, MPERS or other communication devices disclosed herein may be configured by a seller, dealer, or other entity with a particular power mode before being provided to users. The power modes may generally not be reconfigurable by the users. Instead, embodiments described herein may reconfigure power modes of MPERS devices over the air (OTA). Even if such an MPERS device is in airplane mode, maximum battery mode, or some other mode in which its communication interface is generally turned off or powered only intermittently, it will still turn on its communication interface periodically as described above (e.g., every 24 hours). The server can send a power mode reconfiguration message to the MPERS device at this time to reconfigure the power mode of the MPERS device when it is temporarily connected during its periodic reporting.

MPERS devices typically have a relatively stripped-down user input interface, which may present challenges to power mode reconfiguration by the user. Further, MPERS devices are often used by the elderly and/or disabled who may have diminished or limited mental faculties, thereby presenting further difficulties to power mode reconfiguration by the user. Accordingly, embodiments described herein may facilitate reconfiguration of power modes of MPERS devices notwithstanding the foregoing.

Embodiments described herein are not limited to implementation in medical alert systems and/or MPERS devices. Indeed, other communication devices for other uses and/or in other industries may benefit from software reconfigurable power modes. For example, some Internet of Things (IoT) networks may include IoT devices with very basic user input interfaces and/or may include numerous IoT devices deployed over a wide area, in which circumstances embodiments described herein may be implemented to reconfigure power modes of the IoT devices.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 depicts an example operating environment 100 in which MPERS devices 102 may be implemented, arranged in accordance with at least one embodiment described herein. The environment 100 may generally include a network 104, one or more servers 106, communication devices 108, satellites 110, and the MPERS devices 102.

In general, the network 104 may include one or more wide area networks (WANs) and/or local area networks (LANs) that enable the MPERS devices 102, the server 106, and the communication devices 108 to communicate with each other. In some embodiments, the network 104 may include the Internet, including a global internetwork formed by logical and physical connections between multiple WANs and/or LANs. Alternately or additionally, the network 104 may include one or more cellular radio frequency (RF) networks, a voice over Internet Protocol (VOIP) service a Voice over Long-Term Evolution (VoLTE) service, a public switched telephone network (PSTN), and/or one or more wired and/or wireless networks such as 802.xx networks, Bluetooth access points, wireless access points, Internet Protocol (IP)-based networks, or other wired and/or wireless networks. The network 104 may also include servers that enable one type of network to interface with another type of network.

The server 106 may include one or more computer servers configured to provide various services to users through the network 104. For example, the server 106 may provide monitoring services (e.g., emergency monitoring, security monitoring, other types of monitoring, etc.), emergency response services, and/or emergency information access services, etc.

The communication devices 108 may include any appropriate device for communicating with the MPERS devices 102 directly or through the network 104. For example, each of the communication devices 108 may include a smartphone, a tablet computer, a landline telephone, or other suitable communication device. The communication devices 108 may also communicate with the server 106.

The MPERS devices 102 may communicate with the server 106 wirelessly over the network 104. For example, the MPERS devices 102 may use any available cellular wireless standards or technologies, such as, Global System for Mobile communications (GSM), General Packet Radio Service (GPRS), Code-Division Multiple Access (CDMA), Wideband CDMA (WCDMA), Universal Mobile Telecommunications System (UMTS), third generation (3G) wireless mobile telecommunications technology, fourth generation (4G) wireless mobile telecommunications technology, Long-Term Evolution (LTE), LTE Advanced, or any other suitable wireless communication protocols to communicate with the server 106.

The MPERS devices 102 may communicate with the server 106 through a wireless service operator or without a wireless service operator. For example, the MPERS devices 102 may communicate with the server 106 using a wireless carrier's short message service (SMS) to exchange information with the server 106 using SMS messages. An example of communication that does not use the carrier network may be 802.xx WiFi in which the user's own router and internet service serve as the data transport layer from the MPERS device 102 to the network 104.

The server 106 may maintain various information, such as in a database, about the MPERS devices 102. Each of the MPERS devices 102 may periodically report its status to the server 106 according to preconfigured criteria, such as battery status of the corresponding MPERS device 102. In some embodiments, the server 106 may configure the MPERS devices 102 remotely. For example, the server 106 may configure a power mode of the MPERS devices 102 as described in more detail below.

As another example, the server 106 may set a status reporting period, or may set an emergency handling entity (e.g., phone number, IP address, session initiation protocol (SIP) number) or an intended reporting entity for each of the MPERS devices 102 to communicate with. When an emergency event or other predetermined condition occurs, the corresponding MPERS device 102 may communicate with the emergency handling entity or the intended reporting entity automatically. The emergency handling entity may include the server 106 or a different entity such as an emergency agency (e.g., a 911 call center) or an alarm monitoring company's central station. The communication devices 108 may be associated with or belong to intended reporting entities (e.g., a caregiver or a relative).

Each of the MPERS devices 102 may include a Global Positioning System (GPS) receiver or other satellite receiver to receive signals from the satellites 110 to determine its location (e.g., longitude, latitude, and altitude/elevation). Accordingly, the satellites 110 may include or form a Global Navigation Satellite System (GNSS) such the United States' GPS. In general, the satellites 110 provide radio signals to the MPERS devices 102 to allow calculation of three-dimensional location information, velocity, and timing.

Each of the MPERS devices 102 may include one or more sensors, such as a motion sensor (e.g., an accelerometer), a gyro, or other sensor(s). Alternatively or additionally, each of the MPERS devices 102 includes a communication interface to communicate with the server 106 and/or the communication devices 108 directly or over the network 104. Further, each of the MPERS devices 102 includes a battery to provide power to the various components of the MPERS device 102.

Each of the components (e.g., GPS receiver, sensor(s), communication interface) and functions (e.g., fall detection, geo-fencing) of the MPERS device 102 consumes power from the battery when powered or operational. The more components and functions of the MPERS device 102 that are powered or operational, the shorter a battery life of the battery will be. Moreover, different users of the MPERS devices 102 or caregivers of the users may have different preferences and/or needs with respect to the battery life and/or functionality of the MPERS devices 102. For example, some users may prefer longer battery life with less frequent charging, while other users and/or caregivers may require or desire fall detection and/or geo-fencing functions at the expense of more frequent charging.

Accordingly, the MPERS devices 102 may have different power modes with corresponding functionality and battery life. To simplify the supply chain, it may be beneficial to MPERS device dealers or manufacturers for the MPERS devices 102 to have reconfigurable power modes such that a given MPERS device 102 may be configured to operate in any of the power modes. Thus, rather than having one supply of MPERS devices that have a first fixed power mode and another supply of MPERS devices that have a second fixed power mode that is different than the first fixed power mode, a single supply of MPERS devices may be provided where any device can be configured to operate in any of the available power modes. At the time a given MPERS device 102 is provided to a given user, the power mode of the given MPERS device 102 may be configured according to the preferences and/or needs of the given user. Alternatively or additionally, if the preferences and/or needs of the given user change and/or in other circumstances, the power mode of the given MPERS device 102 may be reconfigured OTA by the server 106.

Embodiments herein have thus far been described in the context of MPERS devices and/or medical alert systems. However, embodiments described herein may instead by implemented in other devices and/or systems. More generally, embodiments described herein may be implemented in communication devices—such as MPERS devices 102 or IoT devices—in any networked system with at least intermittent connectivity between the communication devices and a corresponding server. Accordingly, example operating environments in which communication devices with reconfigurable power modes may be implemented may include emergency wireless communication systems, asset tracking and monitoring systems, logistic systems, fleet management systems, remote control systems, and/or other systems.

Figure 2:
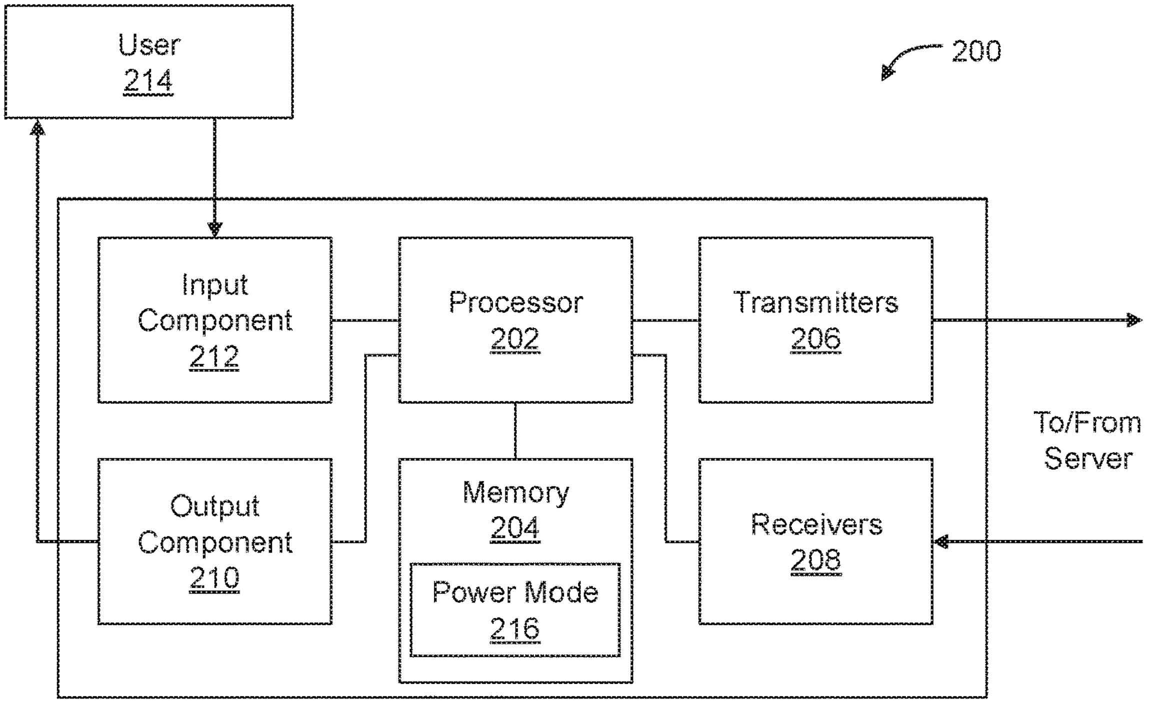
FIG. 2 illustrates an example communication device with reconfigurable power modes.

FIG. 2 illustrates an example communication device 200 (hereinafter "device 200") with reconfigurable power modes, arranged in accordance with at least some embodiments described herein. The device 200 may include, be included in, or correspond to the MPERS device 102 of FIG. 1. Alternatively or additionally, the device 200 may include or be included in an IoT device or other device in an emergency wireless communication system, an asset tracking and monitoring system, a logistic system, a fleet management system, a remote control system, and/or other system.

The device 200 may include a processor 202, a non-transitory computer-readable storage medium such as a memory 204 coupled to the processor 202, a communication interface that includes one or more wireless transmitters 206 and one or more wireless receivers 208, an output component 210, and an input component 212. The processor 202 may include any suitable programmable circuit or circuits such as one or more of a central processing unit (CPU), a microcontroller, a microprocessor, a reduced instruction set circuit (RISC), a digital signal processor (DSP), an application specific integrated circuits (ASIC), a programmable logic circuit (PLC), a field programmable gate array (FPGA), or any other circuit capable of executing the functions described herein.

The memory 204 or other non-transitory computer-readable storage medium may include random access memory (RAM), flash memory, a hard disk drive, a solid state drive, volatile memory, non-volatile memory, or other suitable memory or storage. In an example, the memory 204 may include data and/or instructions that when executed by the processor cause the processor to perform or control performance of one or more of the methods, operations, or functions described herein. Additionally, the memory 204 may include an operating system (OS) and one or more applications.

The transmitters 206 may be configured to transmit control signals and data signals over a wired or wireless network, such as the network 104 of FIG. 1 to, e.g., a server such as the server 106 of FIG. 1. Each of the transmitters 206 may include a transmit chain with a baseband stage, an analog front end (AFE) stage, and an RF stage. Alternatively or additionally, each of the transmitters 206 may include a cellular radio, a WiFi radio, a Bluetooth radio, a GPS radio, or other wireless radio. Each of the transmitters 206 may further include or be coupled to an antenna.

The receivers 208 may be configured to receive control signals and data signals over the wired or wireless network from, e.g., the server. Each of the receivers 208 may include a receive chain with a baseband stage, an AFE stage, and an RF stage. Alternatively or additionally, each of the receivers 208 may include a cellular radio, a WiFi radio, a Bluetooth radio, a GPS radio, or other wireless radio. Each of the receivers 208 may further include or be coupled to an antenna. In some embodiments the transmitters 206 may share one or more components or subcomponents with the receivers 208.

The output component 210 may be configured to output or present information to a user 214. The output component 210 may be or include any component capable of conveying information to user 201. The output component 210 may include a speaker, a codec, a display, or other output device(s) or component(s).

The input component 212 may be configured to receive input from the user 214. The input component 212 may include one or more of a button, a microphone, the codec, or other input device(s) or component(s). For example, the user 214 may actuate the button to place a call; when the call is connected, the microphone and codec may receive and digitize speech or other sounds made by the user 214 for transmission via the transmitters 206 to the server. In some examples, the device 200 may include both a primary button generally to place calls and a reset button to power down the device 200. In this and other examples, the primary button may power on the device after the device 200 has been powered down.

In some examples, the memory 204 stores a power mode configuration 216 of the device 200. When the device 200 is powered on or under other circumstances, the processor 202 may read a value of the power mode configuration 216 in the memory 204 and cause the device 200 to operate accordingly, e.g., with a specific power mode corresponding to the value of the power mode configuration 216. To reconfigure the power mode of the device 200, the processor 202 may write a different value, e.g., corresponding to a different power mode, in the power mode configuration 216 of the memory 204.

The device 200 may operate in any one of multiple power modes according to the value stored in the power mode configuration 216 of the memory 204. As such, the power mode of the device 200 may be reconfigured by, e.g., writing a different value to the power mode configuration 216.

In some embodiments, the power modes include at least a first and second power mode as follows. In the first power mode, also referred to as an always connected mode, the processor 202 and the communication interface of the device 200, including the transmitters 206 and the receivers 208, may be continuously powered. Thus, in the first power mode, the device 200 may be capable of sending or receiving data at any time with little or no delay.

In the second power mode, also referred to as an airplane mode or ready mode, the processor 202 may be continuously powered while the communication interface, including the transmitters 206 and the receivers 208, may be intermittently powered. In the second power mode, for example, the communication interface may be powered on according to a predetermined schedule to report its status and receive any updates or data from the server. Alternatively or additionally, the communication interface may be powered on to report an emergency event in response to actuation of the input component 212. The communication interface may be powered down at other times to conserve battery life. Thus, in the second power mode, there may be some delay before the device 200 is capable of sending or receiving data as the communication interface is powered on.

The device 200 may have one or more other power modes, some examples of which are described elsewhere herein.

Figure 3:
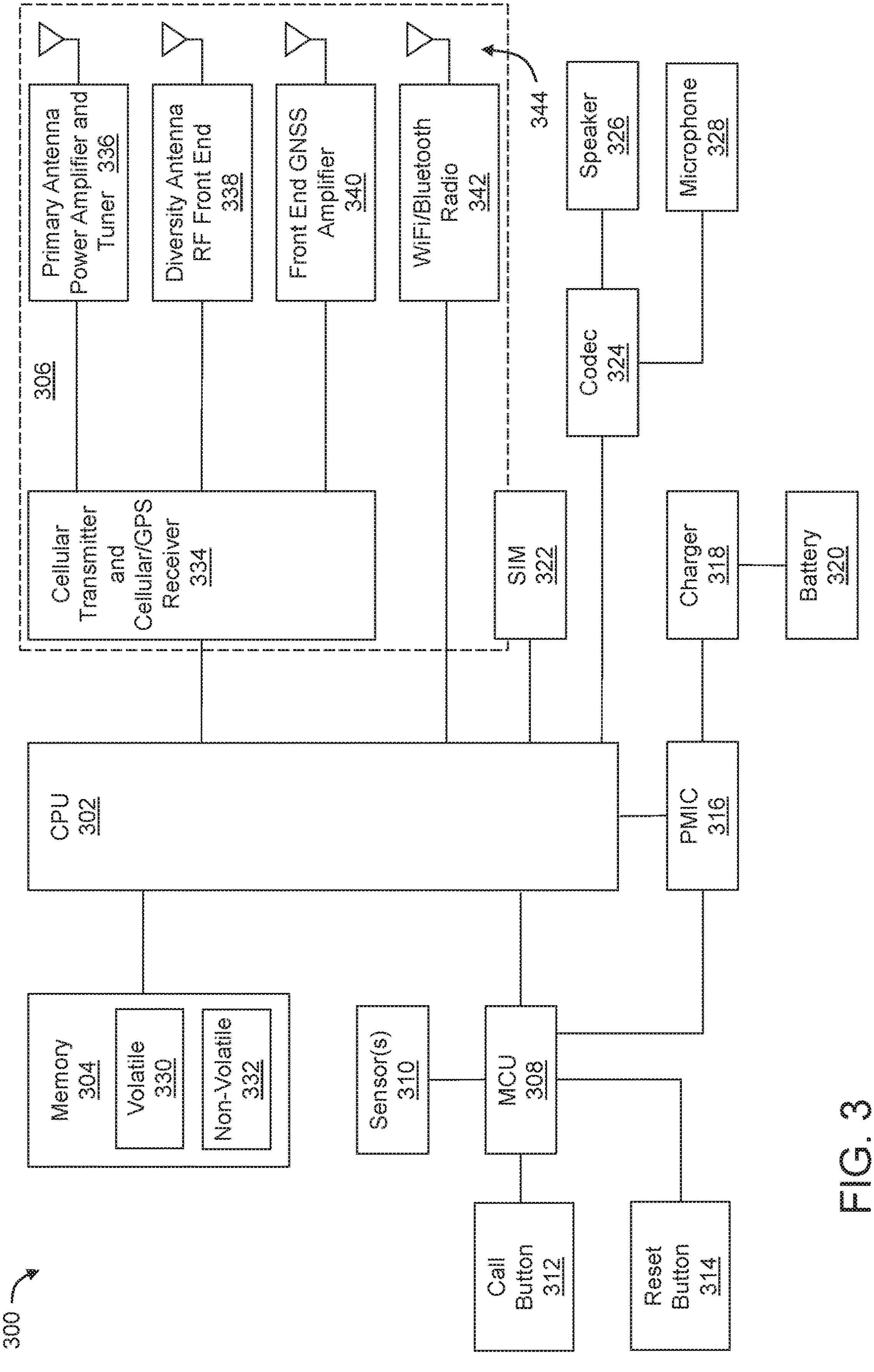
FIG. 3 illustrates another example communication device with reconfigurable power modes.

FIG. 3 illustrates another example communication device 300 (hereinafter "device 300") with reconfigurable power modes, arranged in accordance with at least some embodiments described herein. The device 300 may include, be included in, or correspond to the MPERS device 102 of FIG. 1 or the device 200 of FIG. 2. Alternatively or additionally, the device 300 may include or be included in an IoT device or other device in an emergency wireless communication system, an asset tracking and monitoring system, a logistic system, a fleet management system, a remote control system, and/or other system.

The device 300 may include a CPU 302, a non-transitory computer-readable storage medium such as a memory 304 coupled to the CPU 302, a communication interface 306, an MCU 308, one or more sensors 310, a call button 312, a reset button 314, a power management integrated circuit (PMIC) 316, a charger 318, a battery 320, subscriber identification module (SIM) 322, a codec 324, a speaker 326, and a microphone 328. The various components and subcomponents may be operatively coupled at least as depicted by interconnecting lines in FIG. 3.

The CPU 302 may include, be included in, or correspond to the processor 202 of FIG. 2 and may generally be configured to execute code or instructions in the memory 304 to perform or control performance of one or more of the methods, operations, or functions described herein.

The memory 304 may include, be included in, or correspond to the processor 204 of FIG. 2 and may generally be configured to store data, code, or instructions therein that are executable by the CPU 302. As illustrated, the memory 304 includes both a volatile memory 330 such as RAM or other volatile memory and a non-volatile memory 332 such as NAND flash memory, a solid-state driver, or other non-volatile memory. In some embodiments, the power mode configuration 216 of FIG. 2 may be stored in the non-volatile memory 332 of FIG. 3.

The communication interface 306 may include, be included, or correspond to the communication interface of FIG. 2. As illustrated, the communication interface 306 may include one or more of a cellular transmitter and cellular/GPS receiver 334, a primary antenna power amplifier and tuner 336, a diversity antenna RF front end 338, a front end GNSS amplifier 340, a WiFi/Bluetooth radio 342, and one or more corresponding antennas 344.

The cellular transmitter and cellular/GPS receiver 334 may be configured to process GPS signals received at the front end GNSS amplifier 340 to determine a location, a velocity, and/or an associated time of the device 300 based on the GPS signals. Alternatively or additionally, the cellular transmitter and cellular/GPS receiver 334 may be configured to control the primary antenna power amplifier and tuner 336, the diversity antenna RF front end 338 and/or the front end GNSS amplifier 340, to communicate on a particular frequency band or according to a particular cellular communication standard.

The WiFi/Bluetooth radio 342 may facilitate wireless local area network (WLAN) communications such as IEEE 802.11 and/or Bluetooth communications. FIG. 3 depicts the WiFi/Bluetooth radio 342 as including both WiFi and Bluetooth functionality over a single antenna. In some embodiments, the device 300 WiFi/Bluetooth radio 342 may be divided into two discrete radios, e.g., a WiFi radio and a Bluetooth radio, which may use the same or different antennas 344.

The CPU 302 may be configured to transmit and receive data with a server, such as the server 106 of FIG. 1, or other device or system via any one or more of the components and subcomponents included in the communication interface 306.

The MCU 308 may sit between the CPU 302 and the sensor(s) 310, the call button 312, and the reset button 314 to, in some embodiments, reduce power consumption of the device 300. For example, in some power modes of the device 300, all components of the device 300 that draw power may be shut down except for the MCU 308 and the sensor(s) 310. The MCU 308 may wake the CPU 302 up, e.g., causing the CPU 302 to power up, in response to actuation of the call button 312. Alternatively or additionally, one or more applications running on the CPU 302 may be suspended when not in active use to reduce power consumption and the MCU 308 may signal the CPU 302 to activate the suspended application in response to a signal or signals from the sensor(s) satisfying one or more criteria. Actuation of the reset button 314 may cause the entire device 300, including the MCU 308 and the sensors 310, to power down. The call button 312 and the reset button 314 are examples of user operable tactile input devices that may be included in the device 300. In other embodiments, the device 300 may include one or more other user operable tactile input devices.

The PMIC 316 may include a solid-state IC or other suitable IC configured to control a flow and direction of electrical power. Thus, in some embodiments, the PMIC 316 may be operatively coupled between the charger 318 and one or more of the components of the communication interface 306, the SIM 322, the codec 324, and/or other components of the device 300. As such, the PMIC 316 may be configured to power on or power off any of the components of the device 300 consistent with a given power mode.

The charger 318 may be configured to provide electrical power from the battery 320 or external power supply such as a charging cradle (not shown in FIG. 3) to the components of the device 300, generally through the PMIC 316.

The SIM 322 may include any appropriate subscriber identification card to authenticate the device 300 and to access the wireless networks corresponding to the SIM 322. Other identification modules or cards may be implemented in the device 300 instead of or in addition to the SIM 322.

The codec 324 is configured to decode digital voice data or other digital audio data from the CPU 302, which may have been received via the communication interface 306, to analog voice/audio data for output via the speaker 326. The codec 324 is also configured to encode analog voice/audio data generated by the microphone 328 as digital voice/audio data, which may be provided to the CPU 302 and then to the communication interface 306 for transmission to a server (such as the server 106), an emergency handling entity, an intended reporting entity, or other entity.

Similar to the device 200, the device 300 may store a power mode configuration of the device 300 in the memory 304, specifically in the non-volatile memory 332 in some embodiments. When the device 300 is powered on or under other circumstances, the CPU 302 may read a value of the power mode configuration in the memory 304 and cause the device 300 to operate accordingly, e.g., with a specific power mode corresponding to the value of the power mode configuration in the memory 304. To reconfigure the power mode of the device 300, the CPU 302 may write a different value, e.g., corresponding to a different power mode, in the power mode configuration of the memory 304.

In some embodiments, the power modes of the device 300 include at least a first and second power mode that are similar to the first and second power modes of the device 200. In the first power mode, also referred to as an always connected mode, the CPU 302 and the communication interface 306 may be continuously powered, along with any other components necessary to immediately send or receive data.

In some embodiments, the device 300 may have fall/motion detection and geofencing capabilities. For example, the device 300 may have a fall/motion detection application and a geofencing application which may be executable by the CPU. The fall/motion detection and geofencing capabilities may be unavailable, e.g., off, when the device 300 is in the first power mode. For example, the fall/motion detection application and the geofencing application may not load or execute when the device 300 is in the first power mode.

In an example, the battery 320 may be a 400 milli amp hour (mAh) battery and the device 300 may have a battery life of about 9 days when the device 300 is in the first power mode with no fall/motion detection or geofencing. Alternatively or additionally, when the device 300 is in the first power mode with no fall/motion detection or geofencing, the device 300 may continuously draw about 1.8000 milli amps (mA) and may intermittently draw an additional 0.0745 mA.

In the second power mode the MCU 308 and the CPU 302 may be continuously powered while the communication interface 306 may be intermittently powered. In the second power mode, for example, the communication interface 306 may be powered on according to a predetermined schedule to report its status and receive any updates or data from a server. Alternatively or additionally, the communication interface 306 may be powered on to place a call or otherwise report an emergency event in response to actuation of the call button 312. In the second power mode, there may be a relatively small delay, such as a delay of about 6 seconds, to power on the communication interface 306 to place the call. The communication interface 306 may be powered down at other times to conserve battery life of the battery 320.

Alternatively or additionally, the fall detection and geofencing capabilities of the device 300 may be unavailable when the device 300 is in the second power mode. In an example, the device 300 may have a battery life of about 16 days when the device 300 is in the second power mode with no fall detection or geofencing. Alternatively or additionally, when the device 300 is in the second power mode with no fall detection or geofencing, the device 300 may continuously draw about 0.9600 mA and may intermittently draw an additional 0.0745 mA.

The device 300, or the device 200, may have one or more other power modes, some examples of which will now be described. The device 300, 200 may generally be configured to operate in at least two of the power modes described herein.

A third power mode may be a variation on the first power mode in which fall/motion detection is available and geofencing is unavailable. That is, in the third power mode, also referred to as an always connected mode with fall/motion detection, the CPU 302 and the communication interface 306 may be continuously powered, along with any other components necessary to immediately send or receive data. In addition, the fall/motion detection application may be powered (e.g., loaded and running) in the third power mode.

In an example, the device 300 may have a battery life of about 7 days when the device 300 is in the third power mode. Alternatively or additionally, when the device 300 is in the third power mode, the device 300 may continuously draw about 1.8000 mA and may intermittently draw an additional 0.4439 mA.

A fourth power mode may be a variation on the first power mode in which both fall/motion detection and geofencing are available. That is, in the fourth power mode, also referred to as an always connected mode with fall/motion detection and geofencing, the CPU 302 and the communication interface 306 may be continuously powered, along with any other components necessary to immediately send or receive data. In addition, the fall/motion detection application and the geofencing application may be powered (e.g., loaded and running) in the fourth power mode.

In an example, the device 300 may have a battery life of about 7 days when the device 300 is in the fourth power mode. Alternatively or additionally, when the device 300 is in the fourth power mode, the device 300 may continuously draw about 1.8000 mA and may intermittently draw an additional 0.6050 mA.

In a fifth power mode, also referred to as a shipment mode, the MCU 308 is powered while other components of the device 300 are off. When the device 300 is in the fifth power mode, placement of the device 300 in the charging cradle or actuation of the call button 312 may cause the CPU 302 to wake up, read its power mode configuration in the memory 304, and transition to the power mode specified in the memory 304.

In an example, the device 300 may have a battery life of about 6 months when the device 300 is in the fifth power mode. Alternatively or additionally, when the device 300 is in the fifth power mode, the device 300 may continuously draw about 0.0466 mA.

In a sixth power mode, also referred to as an always off mode, the MCU 308 and the sensor(s) 310 are powered while other components of the device 300 are off except at periodic intervals when the CPU 302, the communication interface 306, and any other necessary components are powered on to, e.g., report status and receive data from a server. Actuation of the call button 312 in the always off mode causes the MCU 308 to wake up the CPU 302, the communication interface 306, and any other necessary components to place a call or otherwise report an emergency event.

In the sixth power mode, there may be a delay, such as a delay of about 30 seconds, to power on the CPU 302 and the communication interface 306 to place a call in response to actuation of the call button 312. The CPU 302 and the communication interface 306 may be powered down at other times to conserve battery life of the battery 320.

In an example, the device 300 may have a battery life of about 4 months when the device 300 is in the sixth power mode. Alternatively or additionally, when the device 300 is in the sixth power mode, the device 300 may continuously draw about 0.0.410 mA and may intermittently draw an additional 0.0745 mA.

In a seventh power mode, also referred to as temporary mode, the MCU 308 and the sensor(s) 310 are powered while other components of the device 300 are off except at periodic intervals when the CPU 302, the communication interface 306, and any other necessary components are powered on to, e.g., report status and receive data from a server. The seventh power mode may be entered by actuation of the reset button 314 or when a remaining battery life of the battery 320 falls below a threshold, e.g., below 20% or 10% or other threshold.

Actuation of the call button 312 when the device 300 is in the seventh power mode causes the MCU 308 to exit the seventh power mode, wake up the CPU 302, and transition to the power mode specified in the power mode configuration in the memory 304 of the device 300. For example, if the power mode configuration in the memory 304 of the device 300 specifies the first power mode, actuation of the call button 312 when the device 300 is in the seventh power mode causes the MCU 308 to transition to the first power mode. A user may then have to actuate the call button 312 a second time if the user desires to place a call.

In the seventh power mode, there may be a delay, such as a delay of about 30 seconds or more, to transition to the power mode specified in the memory 304 and power on the CPU 302 and the communication interface 306 to place a call in response to double actuation of the call button 312. The CPU 302 and the communication interface 306 may be powered down at other times to conserve battery life of the battery 320.

In an example, the device 300 may have a battery life of about 5 months when the device 300 is in the seventh power mode. Alternatively or additionally, when the device 300 is in the seventh power mode, the device 300 may continuously draw about 0.0.410 mA and may intermittently draw an additional 0.0685 mA.

An eighth power mode may be a variation on the second power mode in which fall/motion detection is available and geofencing is unavailable. That is, in the eighth power mode, also referred to as a ready mode with fall/motion detection, the MCU 308 and the CPU 302 may be continuously powered. In addition, the fall/motion detection application may be powered (e.g., loaded and running) in the eighth power mode.

In an example, the device 300 may have a battery life of about 12 days when the device 300 is in the eighth power mode. Alternatively or additionally, when the device 300 is in the eighth power mode, the device 300 may continuously draw about 0.9600 mA and may intermittently draw an additional 0.4439 mA. In the eighth power mode, there may be a relatively small delay, such as a delay of about 6 seconds, to power on the communication interface 306 to place a call or otherwise report an emergency event. The communication interface 306 may be powered down at other times to conserve battery life of the battery 320.

A ninth power mode may be a variation on the second power mode in which both fall/motion detection and geofencing are available. That is, in the ninth power mode, also referred to as ready mode with fall/motion detection and geofencing, the MCU 308 and the CPU 302 may be continuously powered. In addition, the fall/motion detection application and the geofencing application may be powered (e.g., loaded and running) in the ninth power mode. In the ninth power mode, at least some of the communication interface 306 may be intermittently powered to determine a location of the device 300.

In an example, the device 300 may have a battery life of about 11 days when the device 300 is in the ninth power mode. Alternatively or additionally, when the device 300 is in the ninth power mode, the device 300 may continuously draw about 0.9600 mA and may intermittently draw an additional 0.6050 mA. In the ninth power mode, there may be a relatively small delay, such as a delay of about 6 seconds, to power on the communication interface 306 to place a call or otherwise report an emergency event. The communication interface 306 may be powered down at other times to conserve battery life of the battery 320.

Figure 4:
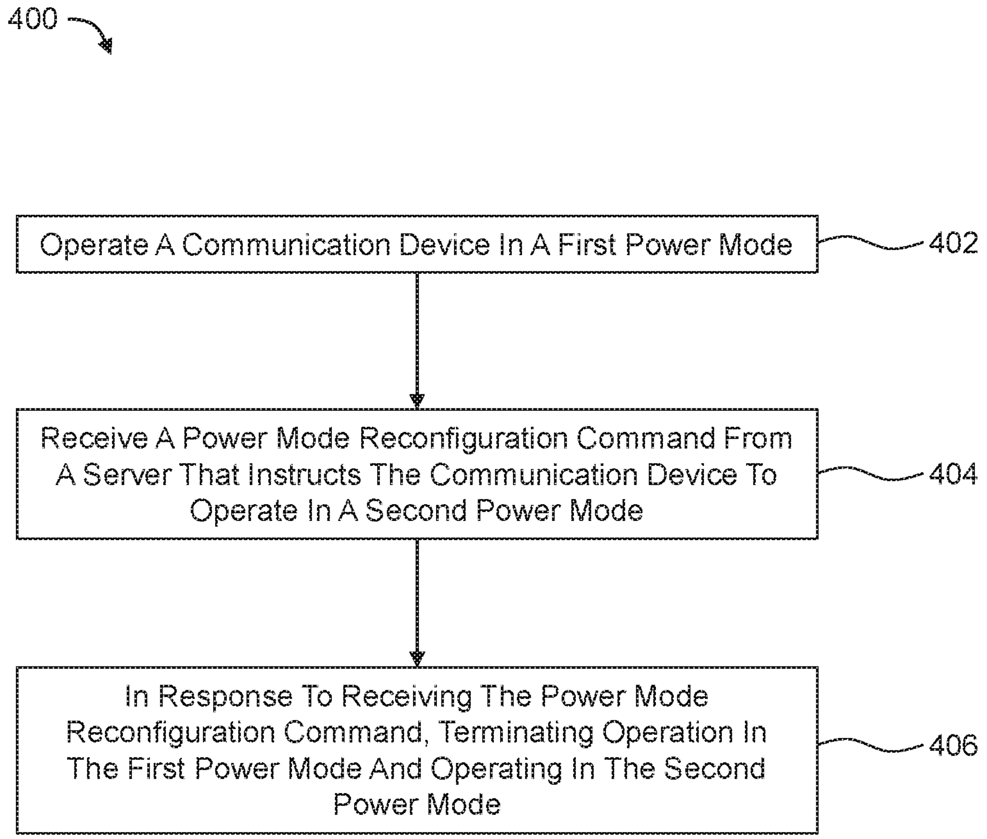
FIG. 4 is a flowchart of an example method to reconfigure power modes of a communication device, all arranged in accordance with at least one embodiment described herein.

FIG. 4 is a flowchart of an example method 400 to reconfigure power modes of a communication device, arranged in accordance with at least one embodiment described herein. The method 400 may be performed by any of the communication devices described herein, such as the MPERs device 102, the device 200, or the device 300. In some embodiments, the method 400 may be embodied in code or other computer-readable instructions stored in a memory, such as the memory 204, 304 and executable by a processor, such as the processor 202 or the CPU 302, to cause the processor to perform or control performance of one or more of the functions or operations of the method 400. The method 400 may include one or more of blocks 402, 404, and/or 406.

In block 402, the method 400 may include operating the communication device in a first power mode. In some embodiments, operating the communication device in the first power mode may include continuously powering a processor of the communication device and continuously powering a communication interface of the communication device. Block 402 may be followed by block 404.

In block 404, the method 400 may include receiving a power mode reconfiguration command from a server that instructs the communication device to operate in a second power mode that is different than the first power mode. Block 404 may be followed by block 406.

In block 406, the method 400 may include, in response to receiving the power mode reconfiguration command, terminating operation of the communication device in the first power mode and operating the communication device in the second power mode. For example, in response to receiving the power mode reconfiguration command, the processor or CPU of the device may write a value corresponding to the second power mode to a power mode configuration in a memory of the communication device. The processor or CPU may then control the communication device to operate in the second power mode according to the value stored in the power mode configuration.

In some embodiments, operating the communication device in the second power mode includes continuously powering the processor of the communication device and intermittently powering a communication interface of the communication device. Intermittently powering the communication interface may include: powering on the communication interface according to a predetermined schedule to communicate with the server; powering on the communication interface to report an emergency event in response to actuation of an emergency button of the communication device by a user of the communication device; and powering down the communication interface at other times.

In some embodiments, operation of the communication device cannot be switched by a user of the communication device between the first and second power modes. Alternatively or additionally, a battery life of the communication device is longer in the first power mode than the second power mode.

One skilled in the art will appreciate that, for the method 400 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

In general, all embodiments described herein can be freely combined, as applicable and if compatible. Further, the invention is not limited to the described embodiments, but can be varied within the scope of the enclosed claims.

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to reconfigure power modes of a mobile personal emergency response service (MPERS) device, the method comprising:

operating the MPERS device in a first power mode in which a communication interface of the MPERS device is continuously powered during operation of the MPERS device in the first power mode;

receiving a power mode reconfiguration command from a server that instructs the MPERS device to operate in a second power mode that is different than the first power mode, wherein in the second power mode, the communication interface of the MPERS device is intermittently powered; and in response to receiving the power mode reconfiguration command, terminating operation of the MPERS device in the first power mode and operating the MPERS device in the second power mode in which the communication interface is intermittently powered, including powering down the communication interface for an interval of time during operation of the MPERS device in the second power mode and powering the communication interface for another interval of time during operation of the MPERS device in the second power mode;

wherein when the communication interface is powered down, the communication interface does not draw any power.

2. The method of claim 1, wherein operation of the MPERS device cannot be switched by a user of the MPERS device between the first and second power modes.

3. The method of claim 1, wherein a battery life of the MPERS device is longer in the first power mode than the second power mode.

4. The method of claim 1, wherein operating the MPERS device in the first power mode comprises continuously powering a processor of the MPERS device and wherein operating the MPERS device in the second power mode comprises continuously powering the processor of the MPERS device.

5. The method of claim 1, wherein intermittently powering the communication interface comprises:

powering on the communication interface according to a predetermined schedule to communicate with the server;

powering on the communication interface to report an emergency event in response to actuation of an emergency button of the MPERS device by a user of the MPERS device; and powering down the communication interface at other times.

6. The method of claim 1, further comprising:

suspending an application running on a processor of the MPERS device when the application is not in active use, the application comprising one or both of a fall/motion detection application or a geofencing application; and signaling the processor to activate the suspended application in response to a signal from a sensor satisfying a criteria.

7. A mobile personal emergency response service (MPERS) device with reconfigurable power modes, the MPERS device comprising:

a microcontroller unit (MCU);

a processor communicatively coupled to the MCU;

a communication interface communicatively coupled to the processor; and a non-transitory computer-readable storage medium communicatively coupled to the processor and having computer-readable instructions stored thereon that are executable by the processor to perform or control performance of operations comprising:

operating the MPERS device in a first power mode in which the communication interface of the MPERS device is continuously powered;

receiving a power mode reconfiguration command from a server that instructs the MPERS device to operate in a second power mode that is different than the first power mode, wherein in the second power mode, the communication interface of the MPERS device is intermittently powered; and in response to receiving the power mode reconfiguration command, terminating operation of the MPERS device in the first power mode and operating the MPERS device in the second power mode in which the communication interface is intermittently powered, including powering down the communication interface for an interval of time during operation of the MPERS device in the second power mode and powering the communication interface for another interval of time during operation of the MPERS device in the second power mode:

wherein when the communication interface is powered down, the communication interface does not draw any power.

8. The MPERS device of claim 7, further comprising not more than two user operable tactile input devices coupled to the MCU, wherein actuation of a corresponding one of the not more than two user operable tactile input devices is configured to initiate a corresponding preconfigured operation.

9. The MPERS device of claim 8, wherein operation of the MPERS device cannot be switched by a user of the MPERS device between the first and second power modes by actuation of any of the not more than two user operable tactile input devices.

10. The MPERS device of claim 7, further comprising a battery coupled to provide power to each of the processor and the non-transitory computer-readable storage medium, wherein a battery life of the battery is longer in the first power mode than the second power mode.

11. The MPERS device of claim 7, wherein operating the MPERS device in the first power mode comprises continuously powering the processor and wherein operating the MPERS device in the second power mode comprises continuously powering the processor.

12. The MPERS device of claim 7, wherein intermittently powering the communication interface comprises:

powering on the communication interface according to a predetermined schedule to communicate with the server;

powering on the communication interface to report an emergency event in response to actuation of an emergency button of the MPERS device by a user of the MPERS device; and powering down the communication interface at other times.

13. The MPERS device of claim 7, further comprising not more than two user operable tactile input devices coupled to the MCU, including:

a call button configured to initiate a call from the MPERS device in response to actuation of the call button; and a reset button configured to power down the entire MPERS device in response to actuation of the reset button.

14. The MPERS device of claim 7, wherein the MCU is configured to:

suspend an application running on the processor when the application is not in active use, the application comprising one or both of a fall/motion detection application or a geofencing application; and signal the processor to activate the suspended application in response to a signal from a sensor satisfying a criteria.

15. A method to reconfigure power modes of a mobile personal emergency response service (MPERS) device, the method comprising:

operating the MPERS device in a first power mode, wherein operating the MPERS device in the first power mode includes:

continuously powering a processor of the MPERS device; and continuously powering a communication interface of the MPERS device;

receiving a power mode reconfiguration command from a server that instructs the MPERS device to operate in a second power mode that is different than the first power mode; and in response to receiving the power mode reconfiguration command, terminating operation of the MPERS device in the first power mode and operating the MPERS device in the second power mode, wherein operating the MPERS device in the second power mode includes:

continuously powering the processor of the MPERS device; and intermittently powering the communication interface of the MPERS device wherein intermittently powering the communication interface comprises:

powering on the communication interface according to a predetermined schedule to communicate with the server;

powering on the communication interface from an off state to report an emergency event in response to actuation of an emergency button of the MPERS device by a user of the MPERS device; and powering down the communication interface at other times.

16. The method of claim 15, wherein operation of the MPERS device cannot be switched by a user of the MPERS device between the first and second power modes.

17. The method of claim 15, wherein a battery life of the MPERS device is longer in the first power mode than the second power mode.

18. The method of claim 15, further comprising:

suspending an application running on a processor of the MPERS device when the application is not in active use, the application comprising one or both of a fall/motion detection application or a geofencing application; and signaling the processor to activate the suspended application in response to a signal from a sensor satisfying a criteria.

* * * * *